Oct. 15, 1929.  J. A. FOSTER  1,732,159
ANTISEPTIC MOUTHPIECE FOR TELEPHONES
Filed Sept. 4, 1928
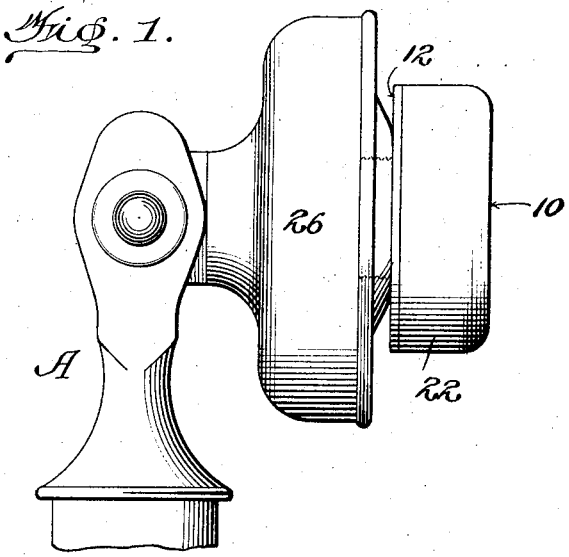
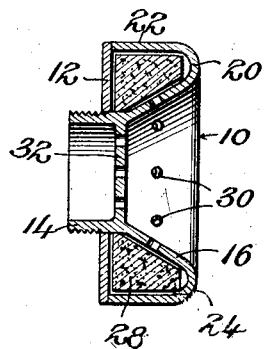 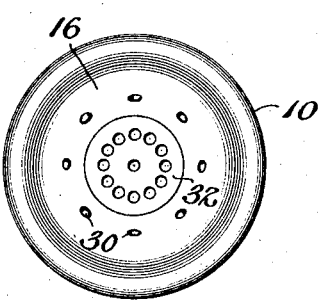 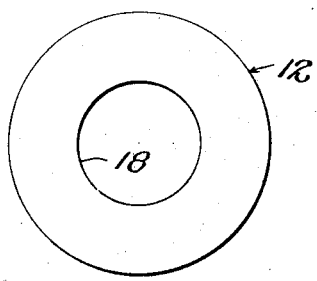
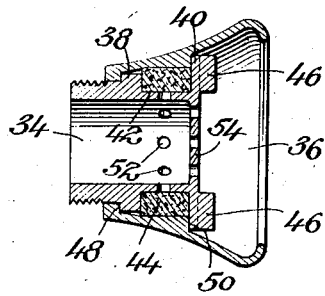 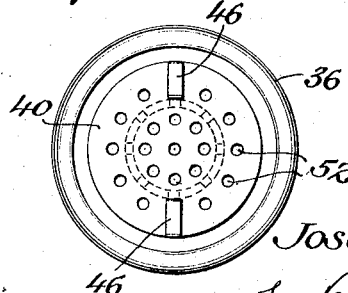
Inventor
Joseph A. Foster,
by Bright & Bailey
Attorneys Patented Oct. 15, 1929

1,732,159

UNITED STATES PATENT OFFICE

JOSEPH A. FOSTER, OF EAST MILLBURY, MASSACHUSETTS

ANTISEPTIC MOUTHPIECE FOR TELEPHONES

Application filed September 4, 1928. Serial No. 303,784.

My invention relates to improvements in antiseptic mouthpieces for telephone transmitters, and my purpose, generally speaking, is to provide an antiseptic mouthpiece which is of simple, inexpensive construction, embodying only two parts which will be held positively in assembly with one another when the mouthpiece is attached to the transmitter of a telephone and which will become disassembled when the mouthpiece is removed from the transmitter, whereby cleaning of the mouthpiece and replenishment of the antiseptic material or replacement of its retaining pad may readily be effected, which will perform its office over relatively long periods of time without the necessity of replenishment of the antiseptic material, and which is strong, durable and thoroughly reliable and efficient in use.

With the foregoing and other purposes in view, my invention consists in the novel features of construction, combination and arrangement of parts as will be hereinafter more fully described, illustrated in the accompanying drawings and defined in the appended claim.

In the drawings, wherein like characters of reference denote corresponding parts in the different views:—

Fig. 1 is a side elevation of the transmitter portion of a telephone showing one form of my improved antiseptic mouthpiece attached thereto;

Fig. 2, a central longitudinal section through the mouthpiece shown in Fig. 1;

Fig. 3, a front elevation of the mouthpiece shown in Fig. 1;

Fig. 4, an elevation of the closure disk for the rear of the mouthpiece shown in Fig. 1;

Fig. 5, a central longitudinal section through a mouthpiece differing slightly in construction from the mouthpiece shown in Figs. 1 to 4; and Fig. 6, a front elevation of the mouthpiece shown in Fig. 5.

Referring first to Figs. 1 to 4 of the drawings, it will be observed that my improved mouthpiece therein illustrated is composed of only two parts; viz members 10 and 12 which may be formed from any suitable or desired material.

Member 10 is inclusive of a hollow, exteriorly threaded shank 14 having an integral wall 16 flaring outwardly from its forward end for directing sound waves through said shank, while member 12 is in the form of a disk or ring having a central opening 18 formed therein whereby it is adapted for engagement over the shank 14 of member 10. The wall 16 of member 10, after being extended outwardly a suitable distance, is turned upon itself as at 20 and then is directed rearwardly as at 22 to provide a chamber 24 for the reception of antiseptic material, the rearwardly directed portion 22 terminating substantially in a plane passing through the shank 14 at the junction therewith of the flared wall 16 whereby the member 12 when engaged over the shank 14 abuts the rear edge portion 22 and closes the chamber 24, member 12 as is manifest being disposed between the portion 22 and the transmitter casing 26 of a telephone indicated generally at A, when the shank 14 is threaded into the usual interiorly threaded mouthpiece opening formed in said transmitter casing, so that by turning the member 10 into tight engagement with said casing, member 12 is clamped securely against member 10 in closing relation to the chamber 24.

An absorbent pad 28 saturated with an antiseptic solution is placed within chamber 24 and apertures 30 are formed in the flared wall 16 for the escape of antiseptic fumes from said chamber. By unscrewing member 10 from the transmitter casing the member 12 is loosened and may be readily separated from member 10 to afford access to the chamber 24 for any purpose desired, for example, cleaning of the parts 10, 12, replacement of the pad 28, or replenishment of the antiseptic solution.

Preferably but not necessarily an apertured wall 32 is formed across the shank 14 to strengthen the member 10 and to serve as a protector for the mechanism contained within the transmitter casing 26.

Referring now to Figs. 5 and 6 of the drawings, it will be observed that my improved mouthpiece therein illustrated also is formed of only two parts; viz, members 34 and 36 which, like members 10, 12, may be formed from any suitable or desired material. Member 34 is hollow and of cylindrical form and is exteriorly threaded at its inner end for threaded engagement with the usual interiorly threaded mouthpiece opening in the transmitter casing. Intermediate its ends it is formed with an exterior annular flange 38 while at its outer end it is provided with a second annular flange 40 spaced from the flange 38 to provide a chamber 42 for the reception of an absorbent pad 44 adapted to be saturated with antiseptic material, lugs 46 being formed on the outer face of flange 40 to facilitate engagement and disengagement of said member 34 with and from a transmitter casing.

Member 36 is hollow and is adapted for engagement over member 34, being provided with interior annular shoulders 48, 50 adapted for abutting engagement with the flanges 38, 40, respectively, whereby, when member 34 is threaded into a transmitter casing, member 36 is clamped securely against the member 34 in closing relation to the chamber 42. Member 36 is flared outwardly to direct sound waves through the member 34 and the latter member and its flange 40 are provided with apertures 52 for the escape of antiseptic fumes from the chamber 42. Preferably member 34 like member 10 is provided with an apertured wall 54 to strengthen said member and to serve as a protector for the mechanism contained within a transmitter casing to which my mouthpiece may be attached.

I claim:

An antiseptic mouthpiece for telephone transmitters comprising a member having a hollow exteriorly threaded shank for threaded engagement with the usual interiorly threaded mouthpiece opening in the transmitter casing of a telephone, a pair of spaced annular flanges on said member defining therebetween a chamber for the reception of antiseptic material, a second member engaged over said first member to close said chamber, said second member being inclusive of an outwardly flared wall for directing sound waves through said shank, a pair of spaced shoulders on said second member for engagement with the spaced flanges of said first member, respectively, a portion of said second mentioned member being disposed between said first mentioned member and the transmitter casing whereby said members are clamped together when said shank is threaded into said transmitter casing, antiseptic material within said chamber, said first mentioned member being provided with apertures for the escape of antiseptic fumes from said chamber, and lugs on said first mentioned member within said second mentioned member for finger engagement to facilitate application and removal of the mouthpiece to and from a transmitter casing.

In testimony whereof I hereunto affix my signature.

JOSEPH A. FOSTER.